US010061803B2

(12) United States Patent
Osamura et al.

(10) Patent No.: US 10,061,803 B2
(45) Date of Patent: Aug. 28, 2018

(54) PROCESSING METHOD AND PROCESSING SYSTEM

(71) Applicant: KAMOME Engineering, Inc., Tokyo (JP)

(72) Inventors: Kohji Osamura, Tokyo (JP); Takeshi Shiomura, Tokyo (JP)

(73) Assignee: KAMOME Engineering, Inc., Tokyo (JP)

( * ) Notice: Subject to any disclaimer, the term of this patent is extended or adjusted under 35 U.S.C. 154(b) by 0 days.

(21) Appl. No.: 15/916,889

(22) Filed: Mar. 9, 2018

(65) Prior Publication Data

US 2018/0196848 A1 Jul. 12, 2018

Related U.S. Application Data

(63) Continuation of application No. PCT/JP2016/070837, filed on Jul. 14, 2016.

(51) Int. Cl.
*G06F 17/30* (2006.01)
*G06F 12/02* (2006.01)
*G06F 11/14* (2006.01)

(52) U.S. Cl.
CPC .... *G06F 17/30442* (2013.01); *G06F 12/0238* (2013.01); *G06F 17/30504* (2013.01); *G06F 11/1464* (2013.01); *G06F 2212/1041* (2013.01)

(58) Field of Classification Search
CPC ........ G06F 17/30463; G06F 17/30312; G06F 17/30321; G06F 17/30433; G06F 17/30864; G06F 17/30867; G06F 17/30911

(Continued)

(56) References Cited

U.S. PATENT DOCUMENTS

| | | | |
|---|---|---|---|
| 6,839,732 B1 * | 1/2005 | Vincent | H04L 29/06 |
| 7,028,073 B1 * | 4/2006 | Bui | H04L 63/10 |
| | | | 709/203 |

(Continued)

FOREIGN PATENT DOCUMENTS

| | | |
|---|---|---|
| JP | 2006-285811 A | 10/2006 |
| JP | 2009-217707 A | 9/2009 |
| JP | 2015-49780 A | 3/2015 |

OTHER PUBLICATIONS

The Written Opinion of the ISA (PCT/ISA/237) dated Oct. 18, 2016 in PCT/JP2016/070837 (English translation of the Written Opinion will be issued and uploaded to Patentscope of WIPO.).

*Primary Examiner* — Shahid Alam
(74) *Attorney, Agent, or Firm* — Metrolexis Law Group, PLLC

(57) ABSTRACT

In a processing method, a processing apparatus receives a dataset and a key identifying processing on the dataset from an input apparatus, and inputs the received dataset and key to an update reception apparatus; the update reception apparatus identifies an accumulation apparatus for accumulating the dataset, based on the key, and transmits an update request containing the dataset and key to the accumulation apparatus; the accumulation apparatus stores the dataset and the key in association with each other when receiving the update request; the accumulation apparatus acquires the dataset stored in association with the key and transmits the acquired dataset to the processing apparatus; and if the dataset from the accumulation apparatus satisfies a dataset condition required for the processing for the key, the processing apparatus performs the processing for the key on the acquired dataset and outputs the resultant dataset to a reference apparatus.

13 Claims, 10 Drawing Sheets

(58) Field of Classification Search
USPC .......................................................... 707/713
See application file for complete search history.

(56) References Cited

U.S. PATENT DOCUMENTS

| | | | | |
|---|---|---|---|---|
| 7,657,609 | B2* | 2/2010 | Klevenz | G06F 9/547 |
| | | | | 709/203 |
| 8,089,986 | B2* | 1/2012 | Adamczyk | H04J 3/16 |
| | | | | 370/252 |
| 8,204,996 | B2* | 6/2012 | Kim | H04W 4/02 |
| | | | | 709/224 |
| 8,433,293 | B2* | 4/2013 | Lee | H04L 67/26 |
| | | | | 455/412.1 |
| 8,832,264 | B2* | 9/2014 | Pauley | H04L 63/306 |
| | | | | 370/428 |
| 9,197,527 | B2* | 11/2015 | Pauley | H04L 63/306 |
| 2005/0050055 | A1* | 3/2005 | Chang | G06F 3/0607 |
| 2006/0221824 | A1 | 10/2006 | Anzai | |
| 2006/0235831 | A1* | 10/2006 | Adinolfi | G06Q 40/00 |
| | | | | 707/704 |
| 2007/0011208 | A1* | 1/2007 | Smith | G06F 17/30377 |
| 2007/0086433 | A1* | 4/2007 | Cunetto | H04L 51/36 |
| | | | | 370/352 |
| 2008/0195738 | A1* | 8/2008 | Luo | H04L 12/18 |
| | | | | 709/227 |
| 2015/0067303 | A1 | 3/2015 | Fujiwara et al. | |

* cited by examiner

211 ACCUMULATED DATA

| KEY | ACCUMULATED DATA |
|---|---|
| K001 | VALUE A=Data_1A<br>VALUE B=Null<br>VALUE C=Null |
| K002 | NUMBER OF ALREADY RECEIVED DATASETS=Data_2N |
| K003 | SUM OF ALREADY RECEIVED VALUES=Data_3T<br>NUMBER OF ALREADY RECEIVED VALUES=Data_3N |
| ...... | ...... |

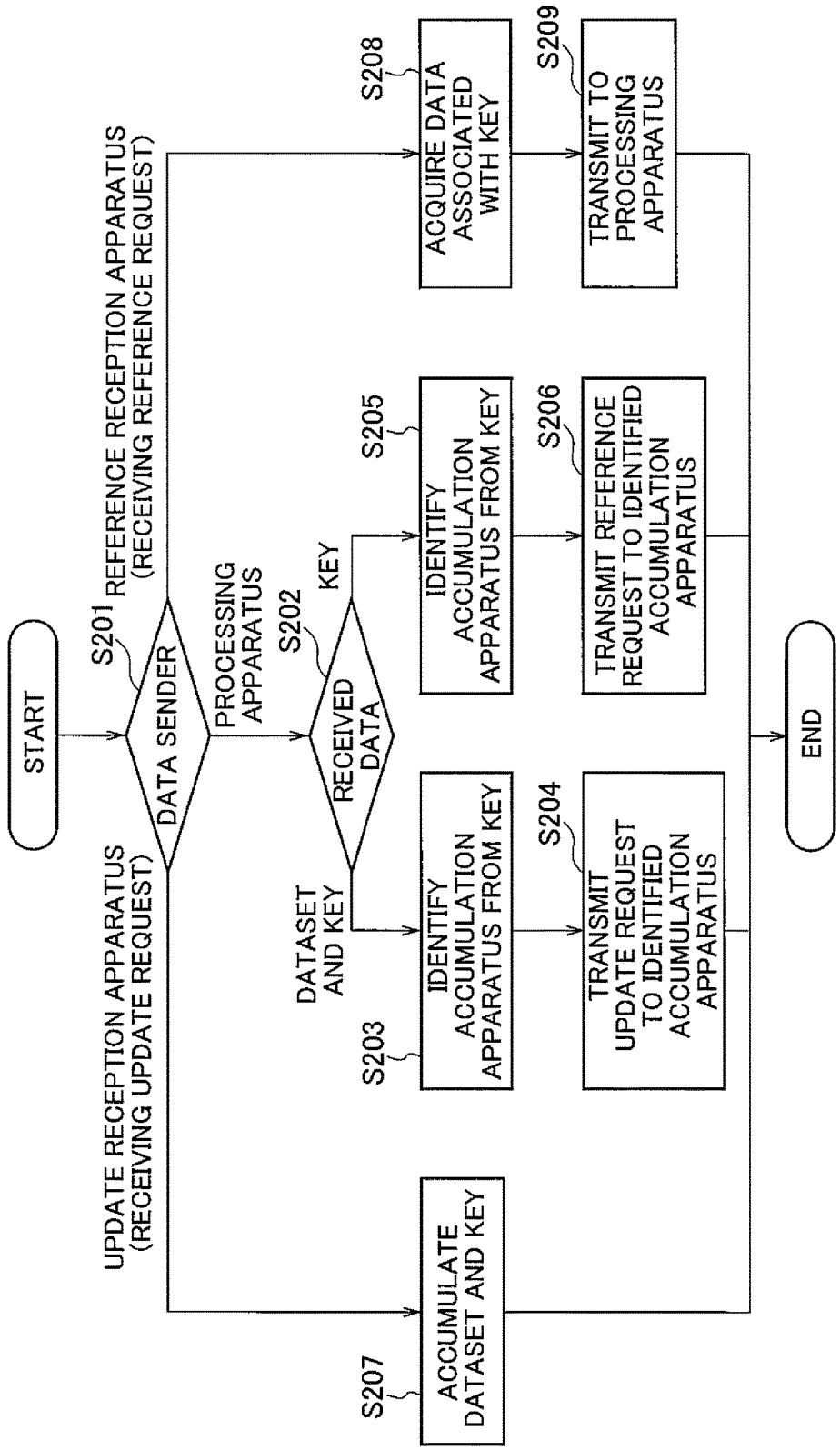

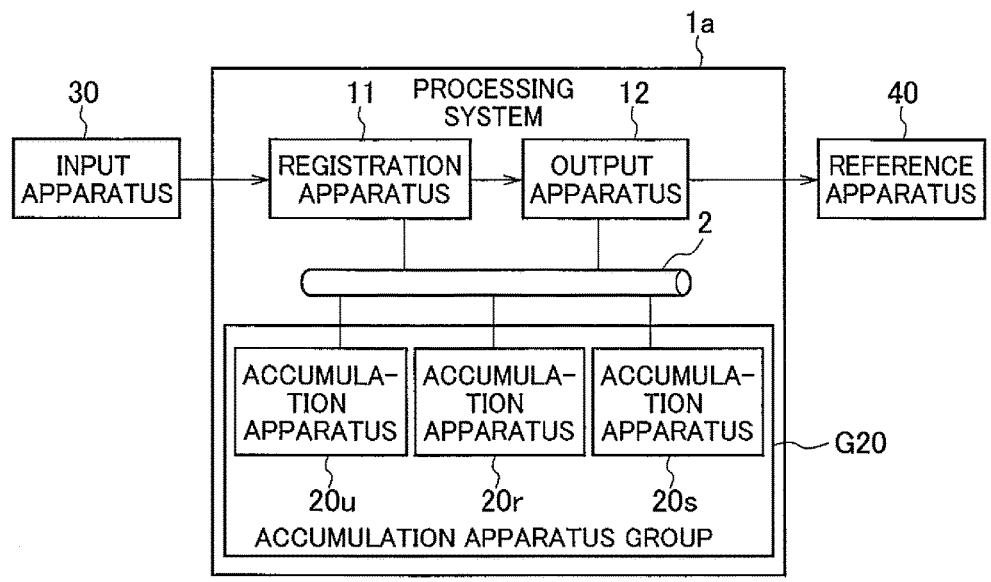
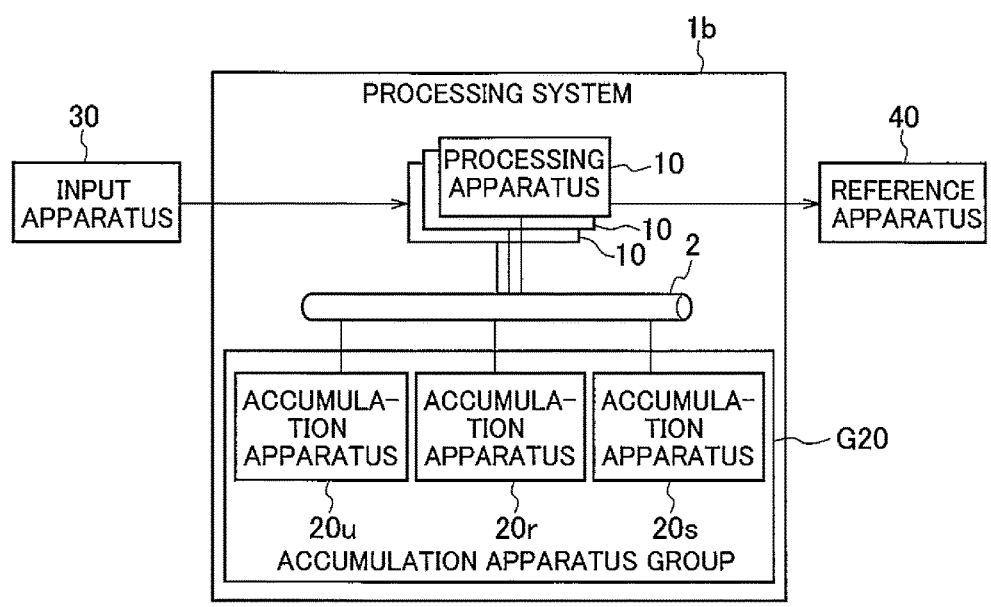

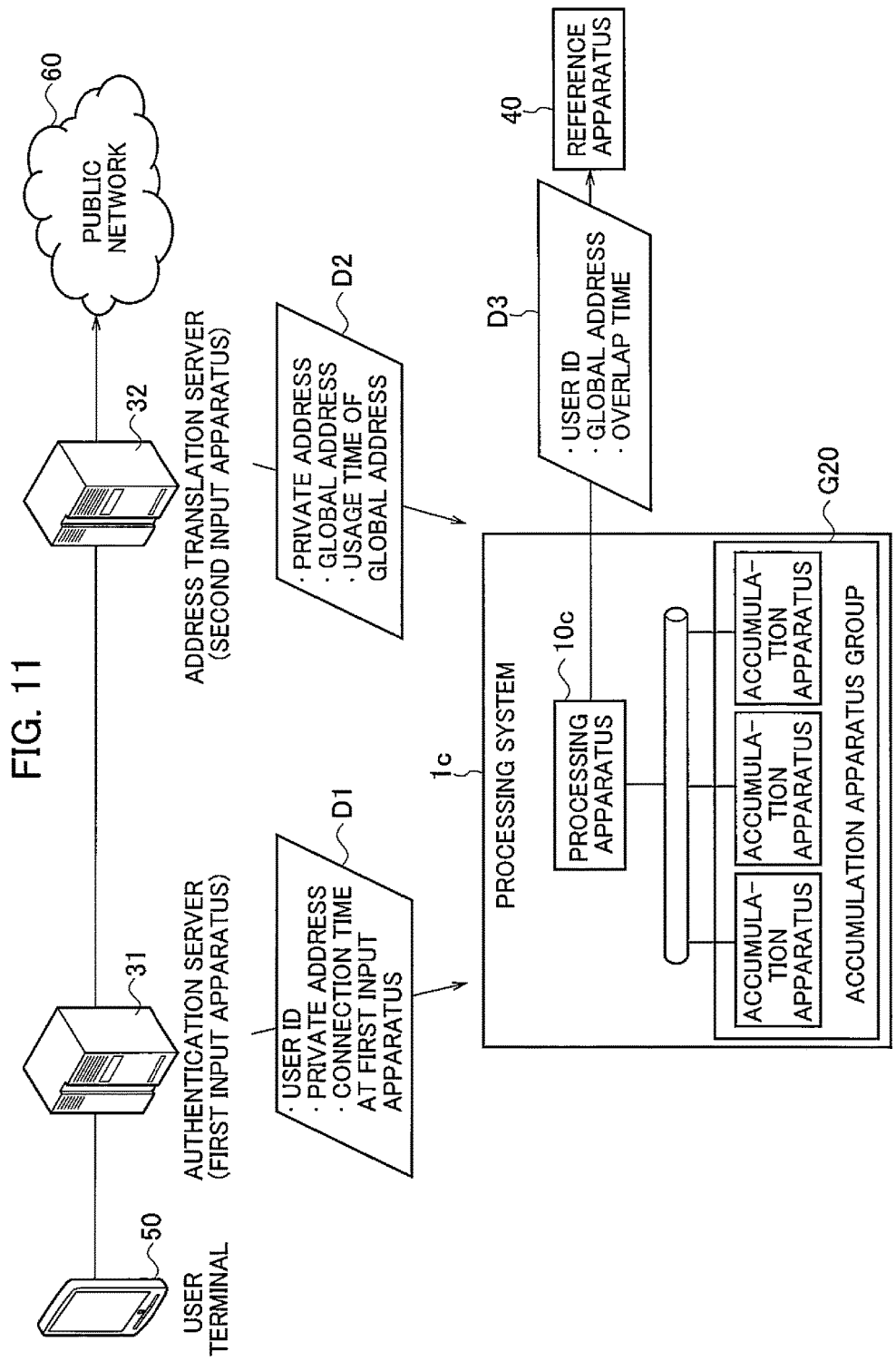

FIG. 12

111c PROCESSING TEMPLATE DATA

| KEY | CONDITION | PROCESSING |
|---|---|---|
| PID1 | CONNECTION TIME ACQUIRED FROM AUTHENTICATION SERVER AND USAGE TIME ACQUIRED FROM ADDRESS TRANSLATION SERVER OVERLAP | OUTPUT USER ID, GLOBAL ADDRESS, AND OVERLAP TIME |
| ..... | ..... | ..... |

FIG. 13

211c ACCUMULATED DATA

| KEY | SENDER | ACCUMULATED DATA |
|---|---|---|
| PID1 | AUTHENTICATION SERVER | USER ID=USER_A<br>PRIVATE ADDRESS=PID<br>CONNECTION TIME AT FIRST INPUT APPARATUS =8:00-12:00 |
| | ADDRESS TRANSLATION SERVER | PRIVATE ADDRESS=PID<br>GLOBAL ADDRESS=GID1<br>USAGE TIME OF GLOBAL ADDRESS=8:00-9:00 |
| | ADDRESS TRANSLATION SERVER | PRIVATE ADDRESS=PID<br>GLOBAL ADDRESS=GID2<br>USAGE TIME OF GLOBAL ADDRESS=9:00-10:30 |
| ..... | | ..... |

FIG. 14

D3 OUTPUT DATA

USER ID=USER_A
GLOBAL ADDRESS=GID1
TIME=8:00-12:00

USER ID=USER_A
GLOBAL ADDRESS=GID2
TIME=9:00-10:30

······

PROCESSING METHOD AND PROCESSING SYSTEM

CROSS-REFERENCE TO RELATED APPLICATIONS

The present application is a continuation application of International Application No. PCT/JP2016/070837, filed Jul. 14, 2016. The content of this application is incorporated herein by reference in their entirety.

TECHNICAL FIELD

The present invention relates to a processing method for use with a processing system including a processing apparatus and a plurality of accumulation apparatuses and to a processing system.

BACKGROUND ART

The development of information devices and communication networks in recent years has made it possible to collect large amounts of data. Also, types of business utilizing these large amounts of data have started to be common as well. However, there is a problem that accumulating and analyzing these large amounts of data require large amounts of CPU resources and storages and therefore a high cost.

To solve such a problem, there has been a processing apparatus that waits for a series of associated information and appropriately aggregates and holds data satisfying a specific condition when outputting the data (see Patent Literature 1, for example). A processing apparatus such as the one described in Patent Literature 1 accumulates input data, waits for further data according to a processing condition pattern for the input data, and outputs the resultant data when an ending condition or the like is satisfied. Such a processing apparatus outputs data subjected to predetermined processing in advance, and is therefore expected to bring about effects of improving the data usability and processing speed at the data output destination.

CITATION LIST

Patent Literature

[Patent Literature 1] Japanese Patent Application Publication No. 2015-49780

SUMMARY OF INVENTION

Technical Problem

However, the processing apparatus described in Patent Literature 1 processes a large amount of data and holds to-be-outputted data and outputted data on an intermediate data table. Hence, the load on the processing apparatus is large. Thus, the processing apparatus may not be suitable for processing a large amount of data and may lack scalability.

In view of this, an object of the present invention is to provide a processing method and a processing system that ensure good data usability at a data output destination and also have good scalability.

Solution to Problem

A first feature of the present invention relates a processing method used in a processing system including a processing apparatus and a plurality of accumulation apparatuses. The processing method according to the first feature of the present invention comprises the steps of causing the processing apparatus to receive a dataset and a key identifying processing to be performed on the dataset from an input apparatus, and input the received dataset and key to an update reception apparatus being one of the plurality of accumulation apparatuses; causing the update reception apparatus to identify an accumulation apparatus in which to accumulate the dataset among the plurality of accumulation apparatuses based on the key and transmit an update request containing the dataset and the key to the identified accumulation apparatus; causing the identified accumulation apparatus to store the dataset and the key in association with each other upon receipt of the update request; causing the identified accumulation apparatus to acquire the dataset stored in association with the key and transmit the dataset to the processing apparatus; and if the dataset acquired from the identified accumulation apparatus satisfies a dataset condition required for the processing associated with the key, causing the processing apparatus to perform the processing associated with the key on the acquired dataset and output the processed dataset to a reference apparatus.

Here, the processing method may further comprise the steps of: causing the processing apparatus to input the key to a reference reception apparatus being one of the plurality of accumulation apparatuses; and causing the reference reception apparatus to transmit a reference request containing the key to the accumulation apparatus identified based on the key, wherein upon receipt of the reference request, the identified accumulation apparatus acquires the dataset stored in association with the key and transmits the dataset to the processing apparatus.

Moreover, the processing method may be, wherein in the step of causing the processing apparatus to input the received dataset and key, the processing apparatus performs pre-processing associated with the key on the dataset and inputs the pre-processed dataset and the key to the update reception apparatus, the update reception apparatus transmits an update request containing the pre-processed dataset and the key to the identified accumulation apparatus, and the identified accumulation apparatus stores the pre-processed dataset and the key in association with each other.

The processing method may be, wherein in a case of outputting the number of datasets sequentially received from the input apparatus to the reference apparatus, the identified accumulation apparatus stores the number of already received datasets as the pre-processed dataset, upon receipt of a new dataset and the key from the input apparatus, the processing apparatus inputs a value obtained in the pre-processing by adding 1 to the number of already received datasets acquired from the identified accumulation apparatus, to the update reception apparatus as a new pre-processed dataset, the update reception apparatus transmits an update request containing the new pre-processed dataset and the key to the identified accumulation apparatus, and the identified accumulation apparatus updates the pre-processed dataset associated with the key to the new pre-processed dataset.

The processing method may be, wherein in a case of outputting an average of values contained in datasets sequentially received from the input apparatus to the reference apparatus, the identified accumulation apparatus stores a numerical value equivalent to a sum of values contained in already received datasets and the number of the values as the pre-processed dataset, upon receipt of a new dataset and the key from the input apparatus, the processing apparatus inputs a new pre-processed dataset to the update reception apparatus, the new pre-processed dataset containing a new numerical value obtained in the pre-processing by updating the numerical value equivalent to the sum of the values acquired from the identified accumulation apparatus based on one or more values contained in the new dataset, and a new number of values obtained in the pre-processing by adding the number of the one or more values contained in the new dataset to the number of values acquired from the identified accumulation apparatus, the update reception apparatus transmits an update request containing the new pre-processed dataset and the key to the identified accumulation apparatus, and the identified accumulation apparatus updates the pre-processed dataset associated with the key to the new pre-processed dataset.

The processing method may be, wherein the pre-processing is processing of determining whether or not the dataset satisfies a predetermined condition, and the pre-processed dataset is a flag indicating whether or not the predetermined condition is satisfied.

The processing method may be, wherein if the processing apparatus receives a plurality of keys associated with a particular dataset from the input apparatus, the processing apparatus performs processing for each of the plurality of keys.

A second feature of the present invention relates a processing method for use with a processing system including a processing apparatus and a plurality of accumulation apparatuses. The processing method according to the second feature comprises the steps of: causing the processing apparatus to receive a first dataset and a key identifying processing to be performed on the first dataset from a first input apparatus, and input the received first dataset and key to an first update reception apparatus being one of the plurality of accumulation apparatuses; causing the first update reception apparatus to identify an accumulation apparatus in which to accumulate the first dataset among the plurality of accumulation apparatuses based on the key and transmit a first update request containing the first dataset and the key to the identified accumulation apparatus; causing the identified accumulation apparatus to store the first dataset and the key in association with each other upon receipt of the first update request; causing the processing apparatus to receive a second dataset and the key from a second input apparatus, and input the received second dataset and key to a second update reception apparatus being one of the plurality of accumulation apparatuses; causing the second update reception apparatus to transmit a second update request containing the second dataset and the key to the identified accumulation apparatus; causing the identified accumulation apparatus to store the second dataset and the key in association with each other upon receipt of the second update request; and causing the processing apparatus to acquire the first dataset and the second dataset associated with the key from the identified accumulation apparatus and, if the acquired first dataset and second dataset satisfy a dataset condition required for the processing associated with the key, perform the processing associated with the key on the acquired first dataset and second dataset and output the processed first dataset and second dataset to a reference apparatus.

Here, the processing method may be, wherein the first input apparatus is an authentication server that verifies a user terminal, the second input apparatus is an address translation server that translates a private address of the user terminal into a global address, the key is the private address of the user terminal, the first dataset contains an identifier and connection time of the user terminal, the second dataset contains the global address and usage time of the global address, if the connection time in the first dataset and the usage time in the second dataset, which are associated with the private address, overlap each other, the processing apparatus outputs data in which the identifier, the global address, and the overlap time are associated with each other based on the first dataset and the second dataset to the reference apparatus.

A third feature of the present invention relates a processing system. The processing system according to the third feature comprises: a processing apparatus; and a plurality of accumulation apparatuses, wherein each of the accumulation apparatuses includes an update requester that, upon receipt of a dataset and a key identifying processing to be performed on the dataset inputted from the processing apparatus, identifies an accumulation apparatus in which to accumulate the dataset among the plurality of accumulation apparatuses based on the key and transmits an update request containing the dataset and the key to the identified accumulation apparatus, an updater that stores the dataset and the key in association with each other upon receipt of the update request, and a referrer that acquires the dataset stored in association with the key and transmits the dataset to the processing apparatus, and the processing apparatus includes a registrator that receives a dataset and a key identifying processing to be performed on the dataset from an input apparatus, and inputs the received dataset and key to an update reception apparatus being one of the plurality of accumulation apparatuses, and an outputter that, if a dataset acquired from the identified accumulation apparatus based on the key satisfies a dataset condition required for the processing associated with the key, performs the processing associated with the key on the acquired dataset and outputs the processed dataset to a reference apparatus.

Here, the processing system may be, wherein the outputter of the processing apparatus further inputs the key to a reference reception apparatus being one of the plurality of accumulation apparatuses, each of the accumulation apparatuses further includes a reference requester that, upon receipt of the key inputted from the processing apparatus, transmits a reference request containing the key to the accumulation apparatus identified based on the key, upon receipt of the reference request, the referrer of the identified accumulation apparatuses acquires the dataset stored in association with the key and outputs the dataset to the processing apparatus.

The processing system may be, wherein the registrator of the processing apparatus further performs pre-processing associated with the key on the dataset and inputs the pre-processed dataset and the key to the update reception apparatus, the update requester of the identified accumulation apparatuses transmits an update request containing the pre-processed dataset and the key to the identified accumulation apparatus, and the updater of the identified accumulation apparatuses stores the pre-processed dataset and the key in association with each other.

A forth feature of the present invention relates a processing system. The processing system according to the forth feature comprises: a processing apparatus; and a plurality of accumulation apparatuses, wherein each of the accumulation apparatuses includes an update requester that, upon receipt of a dataset and a key identifying processing to be performed on the dataset inputted from the processing apparatus, identifies an accumulation apparatus in which to accumulate the dataset among the plurality of accumulation apparatuses based on the key and transmits an update request containing the dataset and the key to the identified accumulation apparatus, an updater that stores the dataset and the key in association with each other upon receipt of the update request, and a referrer that acquires the dataset stored in association with the key and transmits the dataset to the processing apparatus, and the processing apparatus includes a registrator that receives a first dataset and a key identifying processing to be performed on the first dataset from a first input apparatus, and inputs the received first dataset and key to a first update reception apparatus being one of the plurality of accumulation apparatuses, and receives a second dataset and the key from a second input apparatus and inputs the received second dataset and key to a second update reception apparatus being another one of the plurality of accumulation apparatuses, and an outputter that acquires the first dataset and the second dataset associated with the key from the identified accumulation apparatus and, if the acquired first dataset and second dataset satisfy a dataset condition required for the processing associated with the key, performs the processing associated with the key on the acquired first dataset and second dataset and outputs the processed first dataset and second dataset to a reference apparatus.

Advantageous Effect of Invention

According to the above, the present invention can provide a processing method and a processing system that ensure good data usability at a data output destination and also have good scalability.

BRIEF DESCRIPTION OF DRAWINGS

FIG. 8 is a flowchart for describing processing by the accumulation apparatus according to the embodiment of the present invention.

FIG. 9 is a system configuration diagram for describing the system configuration of a processing system according to a modification of the present invention in which different pieces of hardware are installed for given functions of the processing apparatus.

FIG. 10 is a system configuration diagram for describing the system configuration of a processing system according to a modification of the present invention including a plurality of processing apparatuses.

FIG. 11 is a system configuration diagram for describing the system configuration of a processing system according to a modification of the present invention with a plurality of input apparatuses.

FIG. 12 is a diagram for describing an example of the data structure of and the data in processing template data in a processing apparatus according to the modification of the present invention.

FIG. 13 is a diagram for describing an example of the data structure of and the data in accumulated data in an accumulation apparatus according to the modification of the present invention.

FIG. 14 is a diagram for describing an example of the data structure of and the data in data to be outputted by the processing apparatus according to the modification of the present invention.

DESCRIPTION OF EMBODIMENTS

Next, embodiments of the present invention will be described with reference to the drawings. In the illustration of the following drawings, the same or similar elements are denoted by the same or similar reference signs.

In embodiments of the present invention, a "message" is the unit of data to be received and transmitted by a processing system 1 from and to an input apparatus 30 and a reference apparatus 40. A message transmitted from the input apparatus 30 to the processing system 1 contains at least one "dataset" and a "key" associated with the dataset, but may contain a plurality of datasets or a plurality of keys. A "dataset" is the unit of a data string to be processed by the processing system 1. Also, a "key" is an identifier for processed data to be outputted from the processing system 1 to the reference apparatus 40.

(Processing System)

Figure 1:
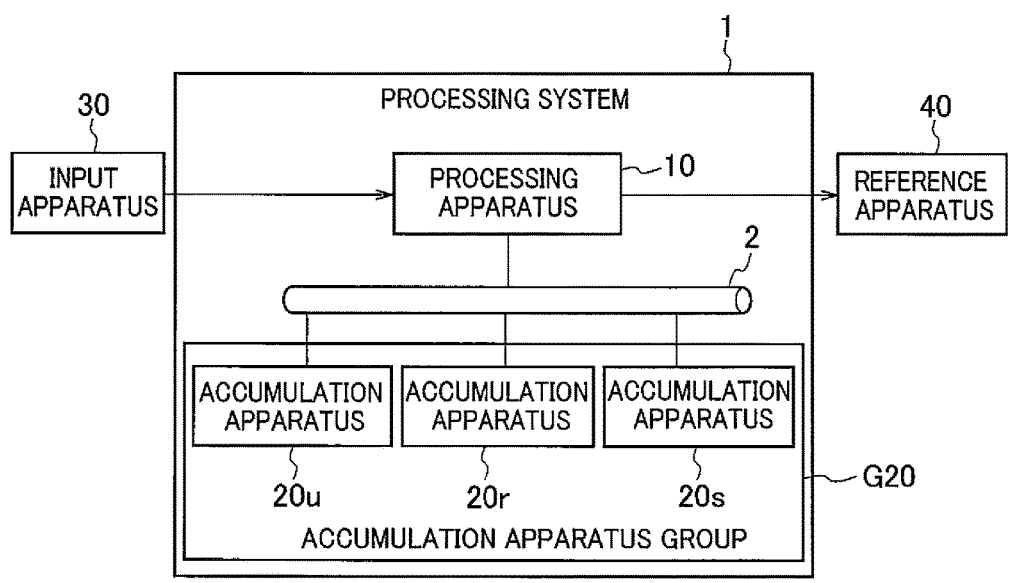
FIG. 1 is a system configuration diagram for describing the system configuration of a processing system according to an embodiment of the present invention.

As illustrated in FIG. 1, the processing system 1 according to an embodiment of the present invention processes a dataset inputted from the input apparatus 30 and outputs it to the reference apparatus 40. The processing system 1, the input apparatus 30, and the reference apparatus 40 are communicatively connected to each other by a bidirectional communication network.

The input apparatus 30 and the reference apparatus 40 are general computers equipped with a processing control device, a storage device, a communication control device, and so on.

The input apparatus 30 inputs a dataset and a key associated with the dataset to the processing system 1. The input apparatus 30 inputs one message to the processing system 1 with at least one dataset and one key contained therein. The reference apparatus 40 acquires desired information by utilizing data outputted from the processing system 1.

The example illustrated in FIG. 1 describes a case where the processing system 1 receives a dataset from one input apparatus 30 and outputs processed data to one reference apparatus 40. However, the present invention is not limited to such a case. The processing system 1 may receive data from a plurality of input apparatuses 30 and transmit data to a plurality of reference apparatuses 40. Also, the input apparatus 30 and the reference apparatus 40 may be installed as different computers, as illustrated in FIG. 1, or installed as one computer.

The processing system 1 sequentially receives messages from the input apparatus 30, accumulates the plurality of datasets contained in the plurality of messages, processes the plurality of datasets based on their keys, and outputs the processed datasets to the reference apparatus 40.

The processing system 1 includes a processing apparatus 10 and an accumulation apparatus group G20. The accumulation apparatus group G20 includes a plurality of accumulation apparatuses 20u, 20r, 20s . . . . The processing apparatus 10 and the plurality of accumulation apparatuses 20u, 20r, 20s . . . are each a general computer equipped with a processing control device, a storage device, a communication control device, and so on. The processing apparatus 10 and the accumulation apparatuses 20u, 20r, 20s are connected by a communication network 2 in such a manner as to be capable of bidirectional communication with each other.

The plurality of accumulation apparatuses 20u, 20r, 20s as the accumulation apparatus group G20 can function similarly to each other. In the embodiment of the present invention, the plurality of accumulation apparatuses 20u, 20r, 20s . . . will also be referred to simply as "accumulation apparatus(es) 20" when they are not distinguished from each other.

Figure 2:
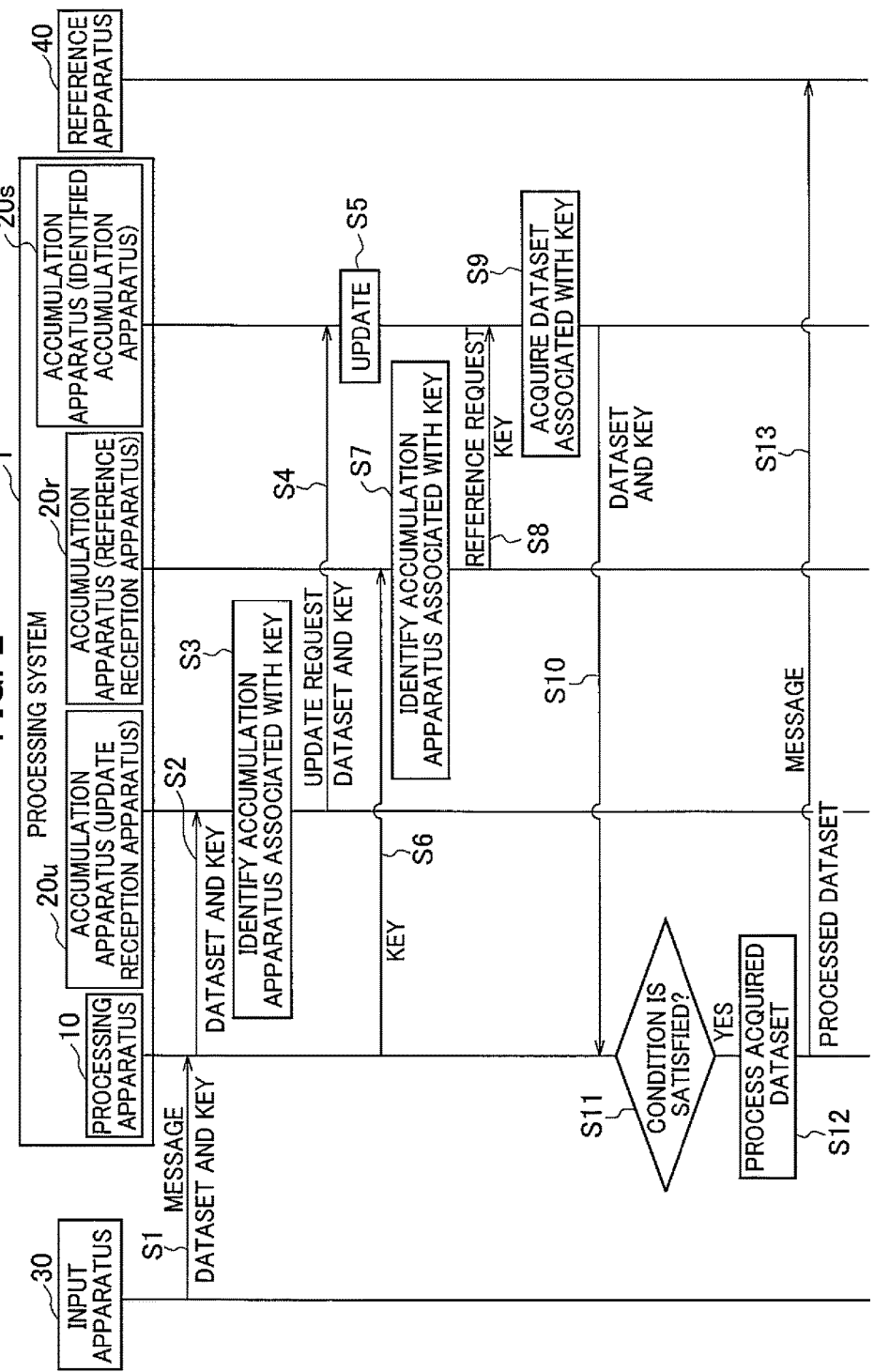
FIG. 2 is a sequence chart for describing processing by the processing system according to the embodiment of the present invention.

As illustrated in FIG. 2, the plurality of accumulation apparatuses 20u, 20r, 20s will also be referred to as "identified accumulation apparatus 20s," "update reception apparatus 20u," and "reference reception apparatus 20r" based on their roles for a particular key. The identified accumulation apparatus 20s accumulates a series of datasets associated with a particular key(s). One identified accumulation apparatus 20s may be associated with one key, or a plurality of identified accumulation apparatuses 20s may be associated with one key. In the case where a plurality of identified accumulation apparatuses 20s are associated with one key, the plurality of identified accumulation apparatuses 20s hold similar data associated with the key and are controlled to implement a backup function. The update reception apparatus 20u receives datasets and keys from the processing apparatus 10 for accumulation of datasets. The reference reception apparatus 20r receives keys from the processing apparatus 10 for reference of datasets.

Note that the identified accumulation apparatus 20s, the update reception apparatus 20u, and the reference reception apparatus 20r may be identical accumulation apparatuses 20 or different accumulation apparatuses 20. Given such circumstances, a given accumulation apparatus 20 according to the embodiment of the present invention may not only operate solely as the identified accumulation apparatus 20s, the update reception apparatus 20u, or the reference reception apparatus 20r but also operate using the functions of more than one of the identified accumulation apparatus 20s, the update reception apparatus 20u, and the reference reception apparatus 20r.

The accumulation apparatus 20 to operate as the update reception apparatus 20u or the reference reception apparatus 20r is determined arbitrarily or based on a predetermined logic. For example, among the accumulation apparatuses 20 in the accumulation apparatus group G20, the accumulation apparatus 20 with the smallest load may receive data from the processing apparatus 10 and operate as the update reception apparatus 20u or the reference reception apparatus 20r. Alternatively, the processing apparatus 10 may sequentially transmit data to the accumulation apparatuses 20u, 20r, 20s . . . in the accumulation apparatus group G20, and each accumulation apparatus 20 may be controlled to operate as the update reception apparatus 20u or the reference reception apparatus 20r in turn.

(Processing Method)

A processing method according to the embodiment of the present invention will be described with reference to FIG. 2.

In step S1, the input apparatus 30 transmits a message to the processing apparatus 10 of the processing system 1. This message contains a dataset and a key.

In step S2, the processing apparatus 10 inputs the dataset and the key acquired in step S1 to a given accumulation apparatus 20 in the accumulation apparatus group G20 (update reception apparatus 20u). In step S3, based on the key received in step S2, the update reception apparatus 20u identifies the accumulation apparatus 20 in which to accumulate the dataset associated with the key (identified accumulation apparatus 20s). In step S4, the update reception apparatus 20u transmits an update request to the identified accumulation apparatus 20s. The update request contains the dataset and the key.

In step S5, upon receipt of the update request from the update reception apparatus 20u, the identified accumulation apparatus 20s stores the dataset contained in the update request in association with the key contained in the update request. Here, the processes from step S1 to step S5 are repeated every time a message is transmitted from the input apparatus 30. The identified accumulation apparatus 20s stores a plurality of datasets in association with a particular key.

In step S6, the processing apparatus 10 inputs the particular key to a given accumulation apparatus 20 in the accumulation apparatus group G20 (reference reception apparatus 20r). In step S7, based on the key received in step S6, the reference reception apparatus 20r identifies the accumulation apparatus 20 in which a dataset(s) associated with the key is(are) accumulated (identified accumulation apparatus 20s). In step S8, the reference reception apparatus 20r transmits a reference request to the identified accumulation apparatus 20s. The reference request contains the key.

In step S9, upon receipt of the reference request from the reference reception apparatus 20r, the identified accumulation apparatus 20s acquires the dataset or datasets associated with the key contained in the reference request. In step S10, the identified accumulation apparatus 20s transmits the dataset or datasets acquired in step S9 and the key associated with the dataset(s) to the processing apparatus 10.

In step S11, based on the key received in step S10, the processing apparatus 10 determines whether or not a condition for transmitting the data to the reference apparatus 40 is satisfied. If the condition is satisfied, the processing apparatus 10 performs predetermined processing in step S12 on the dataset(s) received in step S10. In step S13, the processing apparatus 10 transmits a message to the reference apparatus 40. The message contains the data processed in step S12.

The processes from step S6 to step S13 are performed at predetermined timing. For example, they may be performed when the identified accumulation apparatus 20s stores a dataset in response to a message received from the input apparatus 30, or at other predetermined timing, or when a predetermined condition is satisfied.

Alternatively, the processes from step S6 to step S8 may be skipped. For example, when the update in step S5 is completed, the identified accumulation apparatus 20s may perform the process in step S9 without receiving a reference request from the reference reception apparatus 20r.

(Processing Apparatus)

The processing apparatus 10 will be described with reference to FIG. 3.

A storage device 110 stores processing template data 111. The processing template data 111 identifies processing the processing apparatus 10 should perform in a situation such as when a message is inputted from the input apparatus 30 or when a message is to be outputted to the reference apparatus 40.

Figures 3, 4:
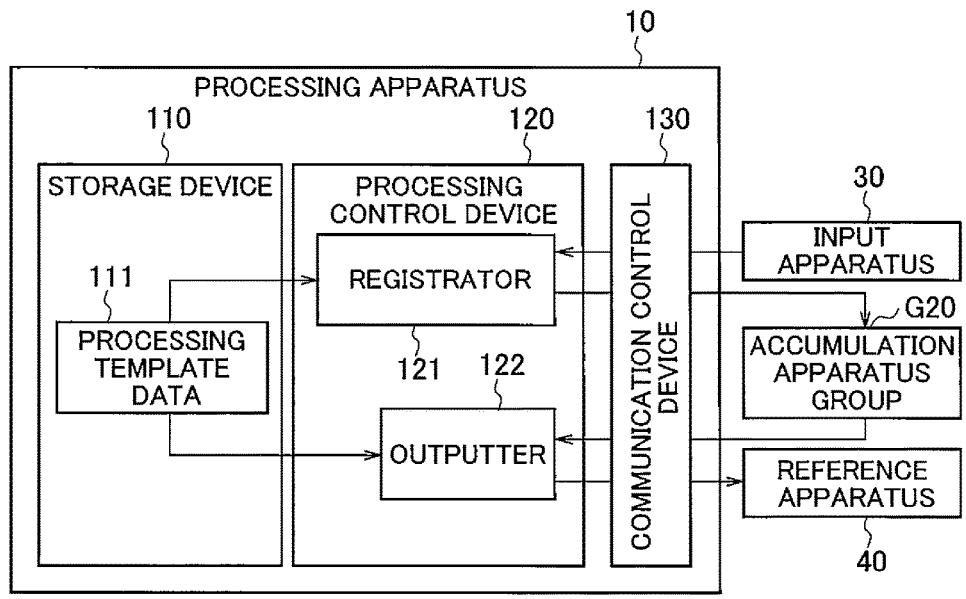
FIG. 3 is a diagram for describing the hardware and functional blocks of a processing apparatus according to the embodiment of the present invention.
FIG. 4 is a diagram for describing an example of the data structure of and the data in processing template data in the processing apparatus according to the embodiment of the present invention.

As illustrated in FIG. 4, in the processing template data 111, data to be accumulated in the accumulation apparatus, pre-processing, a condition, and processing are associated with each other. The "data to be accumulated in the accumulation apparatus" refers to information identifying data to be accumulated in the accumulation apparatus 20 among the pieces of data in a message inputted from the input apparatus 30. For example, it identifies a value to be accumulated in the accumulation apparatus 20 among a plurality of values contained in a dataset. The "pre-processing" refers to processing which the processing apparatus 10 performs when accumulating data in the accumulation apparatus 20. The "condition" refers to a condition for outputting a message to the reference apparatus 40 and is, for example, "predetermined values contained in datasets are all present" or the like. The "processing" refers to processing which the processing apparatus 10 performs to generate a message to be outputted when outputting a message to the reference apparatus 40.

A processing control device 120 includes a registrator 121 and an outputter 122.

The registrator 121 receives a dataset and a key identifying processing to be performed on the dataset from the input apparatus 30, and inputs the received dataset and key to one of the plurality of accumulation apparatuses 20 (update reception apparatus 20u). Here, the registrator 121 refers to the processing template data 111, performs the pre-processing associated with the key on the dataset, and inputs the pre-processed dataset and the key to the update reception apparatus 20u.

The outputter 122 acquires a dataset associated with a key from the accumulation apparatus 20 identified based on the key (identified accumulation apparatus 20s), and if the acquired dataset satisfies the dataset condition required for the processing associated with the key, performs the processing associated with the key on the acquired dataset and outputs the processed dataset to the reference apparatus 40. Here, the outputter 122 refers to the processing template data 111 to determine whether or not the condition associated with the key is satisfied and, if the condition is satisfied, executes the necessary processing and outputs the processed dataset to the reference apparatus 40.

Figure 5:
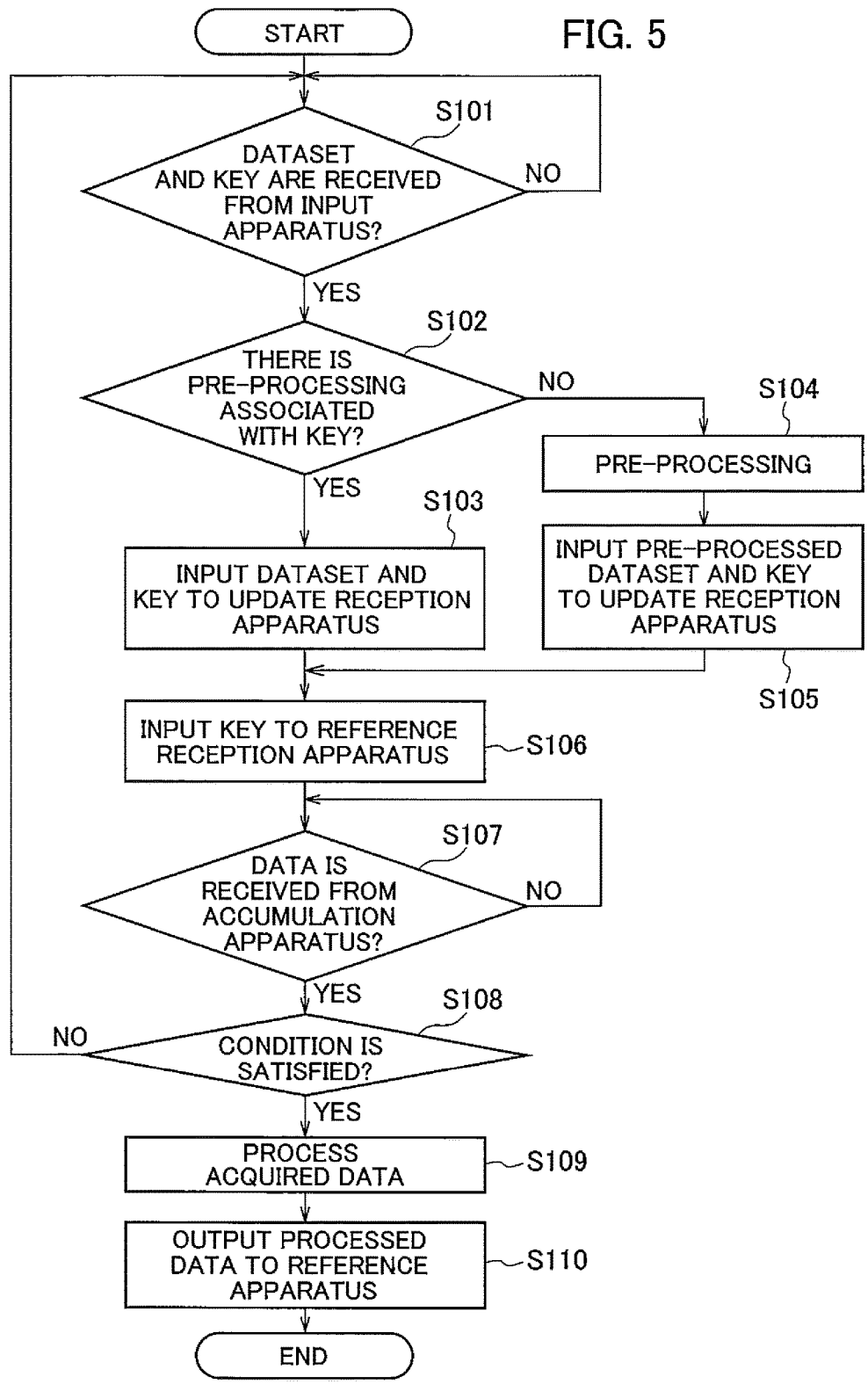
FIG. 5 is a flowchart for describing processing by the processing apparatus according to the embodiment of the present invention.

Processing by the processing apparatus 10 according to the embodiment of the present invention will be described with reference to FIG. 5.

First, in step S101, the processing apparatus 10 awaits receipt of a dataset and a key from the input apparatus 30. Upon receipt of a dataset and a key, the processing apparatus 10 refers to the processing template data 111 in step S102 to determine whether or not there is pre-processing associated with the received key.

If there is no pre-processing, the processing apparatus 10 inputs the dataset and the key received in step S101 to the update reception apparatus 20u in step S103. On the other hand, if there is pre-processing, the processing apparatus 10 executes the pre-processing in step S104 and inputs the pre-processed data (dataset) and the key to the update reception apparatus 20u in step S105. Based on the inputted data and key, the update reception apparatus 20u accumulates the data in the identified accumulation apparatus 20s.

Then, in step S106, the processing apparatus 10 inputs the key received in step S101 to the reference reception apparatus 20r. The processing apparatus 10 then receives the data accumulated in association with the inputted key from the identified accumulation apparatus 20s.

In step S108, the processing apparatus 10 compares the data received in step S107 and the condition associated with the key in the processing template data 111 to determine whether or not the condition is satisfied. If the condition is satisfied, the processing apparatus 10 performs the processing of outputting the data to the reference apparatus 40 in step S109, and outputs the processed data to the reference apparatus 40 in step S110.

(Accumulation Apparatus)

Figures 6, 7:
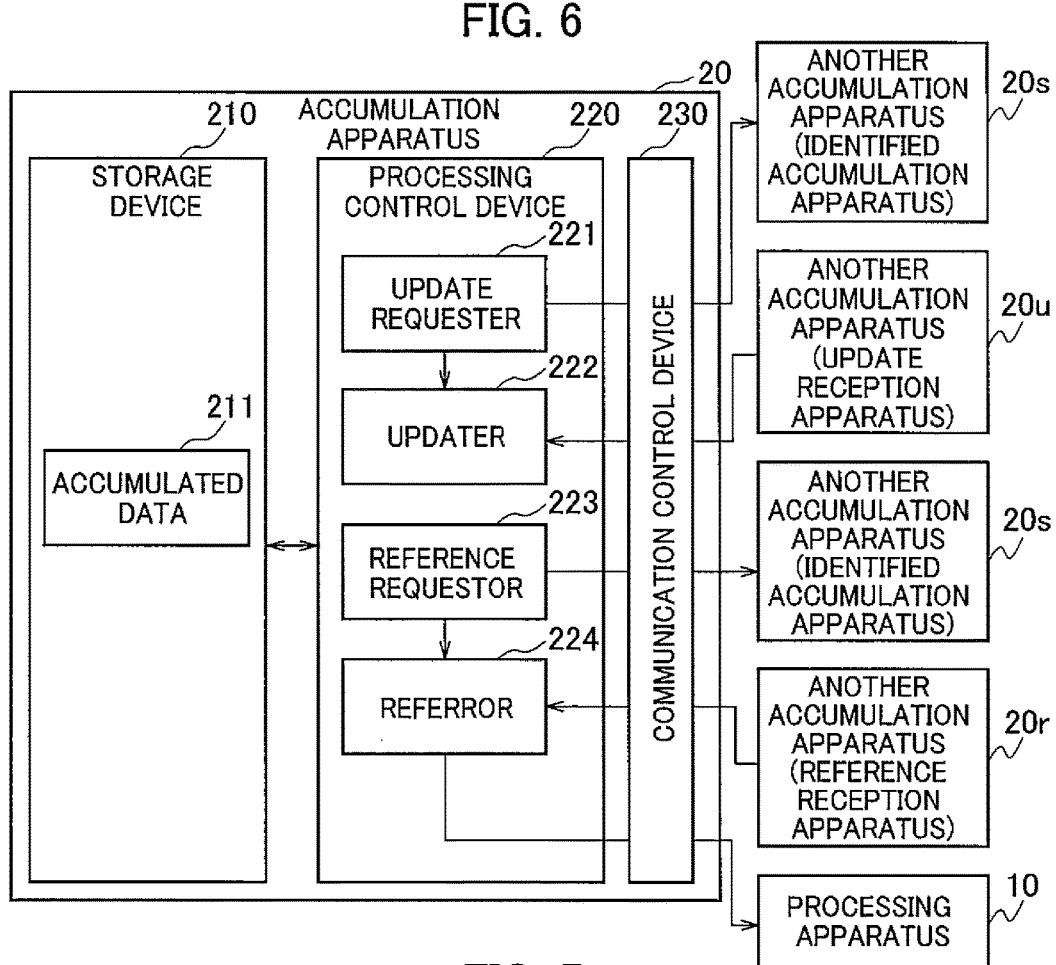
FIG. 6 is a diagram for describing the hardware and functional blocks of an accumulation apparatus according to the embodiment of the present invention.
FIG. 7 is a diagram for describing an example of the data structure of and the data in accumulated data in the accumulation apparatus according to the embodiment of the present invention.

The accumulation apparatus 20 will be described with reference to FIG. 6. In the embodiment of the present invention, the accumulation apparatus 20 functions as at least one of the identified accumulation apparatus 20s, the update reception apparatus 20u, and the reference reception apparatus 20r.

A storage device 210 stores accumulated data 211. As illustrated in FIG. 7, in the accumulated data 211, keys and pieces of data associated with the keys are held in response to requests from the processing apparatus 10. In the accumulated data 211, datasets inputted from the input apparatus 30 may be accumulated as they are, only the data of part of the datasets may be accumulated, or the data pre-processed by the processing apparatus 10 may be accumulated. Also, in the accumulated data 211, a plurality of datasets may be held for one key in some cases.

A processing control device 220 includes an update requester 221, an updater 222, a reference requester 223, and a referrer 224.

The update requester 221, upon receipt of a dataset and a key inputted from the processing apparatus 10, identifies the accumulation apparatus 20 in which to accumulate the dataset (identified accumulation apparatus 20s), based on the key, and transmits an update request containing the dataset and the key to the identified accumulation apparatus 20. The update requester 221 inputs an update request to the updater 222 if its accumulation apparatus 20 is the identified accumulation apparatus 20s.

The updater 222, upon receipt of an update request, stores the dataset and the key in association with each other in the accumulated data 211.

Note that, in the case where the dataset inputted from the input apparatus 30 has been pre-processed by the processing apparatus 10, the update requester 221 and the updater 222 receives the pre-processed data (dataset) instead of the dataset.

The reference requester 223, upon receipt of a key inputted from the processing apparatus 10, transmits a reference request containing the key to the accumulation apparatus 20 identified based on the key (identified accumulation apparatus 20s). The reference requester 223 inputs the reference request to the referrer 224 if its accumulation apparatus 20 is the identified accumulation apparatus 20s.

The referrer 224 acquires a dataset stored in association with a key from the accumulated data 211 and transmits it to the processing apparatus 10.

Processing by the accumulation apparatus 20 will be described with reference to FIG. 8.

Upon receipt of data, the accumulation apparatus 20 determines the direction of the processing in step S201. For example, the accumulation apparatus 20 proceeds to step S202 if the data is received from the processing apparatus 10; the accumulation apparatus 20 proceeds to step S207 if the data sender is the update reception apparatus 20u, that is, if an update request is received; the accumulation apparatus 20 proceeds to step S208 if the data sender is the reference reception apparatus 20r, that is, if a reference request is received.

If the data is received from the processing apparatus 10 and the processing apparatus 10 finds in step S202 that the data received from the processing apparatus 10 is a dataset (or pre-processed data) and a key, the accumulation apparatus 20 proceeds to step S203. In step S203, the accumulation apparatus 20 identifies an accumulation apparatus 20 based on the inputted key. In step S204, the accumulation apparatus 20 transmits an update request to the identified accumulation apparatus 20 (identified accumulation apparatus 20s). This update request contains the dataset and the key inputted from the input apparatus 30.

On the other hand, if the data received from the processing apparatus 10 contains a key but does not contain a dataset or the like, the accumulation apparatus 20 proceeds to step S205. In step S205, the accumulation apparatus 20 identifies an accumulation apparatus 20 based on the inputted key. In step S206, the accumulation apparatus 20 transmits a reference request to the identified accumulation apparatus 20 (identified accumulation apparatus 20s). This reference request contains the key inputted from the input apparatus 30.

If receiving an update request from the update reception apparatus, the accumulation apparatus 20 accumulates the dataset and the key contained in the update request in step S207.

If receiving a reference request from the reference reception apparatus, the accumulation apparatus 20 acquires the data associated with the key contained in the reference request in step S208. In step S209, the accumulation apparatus 20 transmits the data acquired in step S208 to the processing apparatus 10.

(Examples of Processing)

Description will first be given of a case where the processing apparatus 10 outputs datasets sequentially received from the input apparatus 30 to the reference apparatus 40 when a predetermined condition is satisfied. For datasets associated with a particular key, the processing apparatus 10 accumulates a value contained in each dataset in the identified accumulation apparatus 20s. In doing so, for pre-processing, the processing apparatus 10 may determine whether or not the dataset satisfies a predetermined condition. In that case, the identified accumulation apparatus 20s holds a flag as to whether or not the predetermined condition is satisfied for each of the datasets associated with the particular key. The processing apparatus 10 acquires those flags from the identified accumulation apparatus 20s, and outputs the datasets to the reference apparatus 40 if a condition such as all flags being TRUE is satisfied. On the other hand, if the condition is not satisfied, the processing apparatus 10 does not output the datasets to the reference apparatus 40 but determines in the next turn whether or not the condition is satisfied.

Next, description will be given of a case where the processing apparatus 10 outputs the values of items, namely, values A, B, and C in datasets sequentially received from the input apparatus 30 to the reference apparatus 40. As illustrated by the key K001 in FIG. 7, for each of the items of values A, B, and C, the identified accumulation apparatus 20s sets and holds already received data under already received items. In the example illustrated in FIG. 7, "null" represents that data is yet to be received. The processing apparatus 10 determines whether the items of values A, B, and C are contained in the datasets received from the input apparatus 30, and accumulate the values of the contained items in the identified accumulation apparatus 20s. As illustrated by the key K001 in FIG. 4, when the values of the items, or the values A, B, and C, are all present, the processing apparatus 10 gathers the values and output them to the reference apparatus 40.

Further, description will be given of a case where the processing apparatus 10 outputs the number of datasets sequentially received from the input apparatus 30 to the reference apparatus 40. As illustrated by the key K002 in FIG. 7, the identified accumulation apparatus 20s only holds the number of already received datasets. For pre-processing, the processing apparatus 10 acquires the number of datasets held in the identified accumulation apparatus 20s, increments the acquired number to update it, and causes the identified accumulation apparatus 20s to hold the updated number of datasets.

Specifically, the identified accumulation apparatus 20s stores the number of already received datasets in association with a key as a pre-processed dataset. Upon receipt of a new dataset and the key from the input apparatus 30, the processing apparatus 10 inputs a value obtained in pre-processing by adding 1 to the number of already received datasets acquired from the identified accumulation apparatus 20s, to the update reception apparatus 20u as a new pre-processed dataset. The update reception apparatus 20u transmits an update request containing the new pre-processed dataset and the key, and the identified accumulation apparatus 20s updates the pre-processed dataset associated with the key to the new pro-processed dataset.

For example, in the case of the key K002 illustrated in FIG. 4, when the number of already received datasets accumulated in the identified accumulation apparatus 20s exceeds 100, the processing apparatus 10 outputs a message for notifying of this situation to the reference apparatus 40.

Furthermore, description will be given of a case where the processing apparatus 10 outputs the average of values contained in datasets sequentially received from the input apparatus 30 to the reference apparatus 40. As illustrated by the key K003 in FIG. 7, the identified accumulation apparatus 20s stores a numerical value equivalent to the sum of values contained in already received datasets, and the number of these values. Here, the "numerical value equivalent to the sum of values contained in already received datasets" may be the set of values contained in the already received datasets, the sum of these values, or the average of these values, and may be any value as long as the average including the newly received value can be calculated. For pre-processing, the processing apparatus 10 acquires and updates the data held in the identified accumulation apparatus 20s, and causes the identified accumulation apparatus 20s to hold the updated numerical value and number of values.

Specifically, the identified accumulation apparatus 20s stores the numerical value equivalent to the sum of the values contained in the already received datasets and the number of these values as a pre-processed dataset. Upon receipt of a new dataset and the key from the input apparatus 30, the processing apparatus 10 inputs a new pre-processed dataset to the update reception apparatus 20u, the new pre-processed dataset containing a new numerical value obtained in pre-processing by updating the numerical value equivalent to the sum of the values acquired from the identified accumulation apparatus 20s based on the one or more values contained in the new dataset, and a new number of values obtained in pre-processing by adding the number of the one or more values contained in the new dataset to the number of values acquired from the identified accumulation apparatus 20s. The update reception apparatus 20u transmits an update request containing the new pre-processed dataset and the key to the identified accumulation apparatus 20s, and the identified accumulation apparatus 20s updates the pre-processed dataset associated with the key to the new pre-processed dataset.

For example, in the case of the key K003 illustrated in FIG. 4, when the number of values in the pre-processed dataset accumulated in the identified accumulation apparatus 20s exceeds 50, the processing apparatus 10 calculates the average of the values and outputs it to the reference apparatus 40.

Note that if a message inputted from the input apparatus 30 contains one dataset and a plurality of keys, the processing apparatus 10 performs the processing for each of the keys.

(Modifications of Processing System)

Modifications of the processing apparatus 10 of the processing system 1 will be described with reference to FIG. 9 and FIG. 10. The example illustrated in FIG. 9 differs from FIG. 1 in that the processing apparatus 10 is installed with its function divided by a plurality of pieces of hardware, namely, a registration apparatus 11 and an output apparatus 12. The example illustrated in FIG. 10 differs from FIG. 1 in that a plurality of processing apparatuses 10 are installed.

In both examples illustrated in FIG. 9 and FIG. 10, the processing apparatus 10 is embodied as a plurality of pieces of hardware, and therefore the load on the processing apparatus 10 can be reduced. The number of processing apparatuses 10 can be easily and optionally set according to the load on the processing apparatuses 10. Also, in the embodiments of the present invention, the function is divided by the processing apparatus(es) for processing data and the accumulation apparatuses for accumulating data. Thus, any number of processing apparatuses can be installed without having to consider synchronization and consistency of data.

Also, though not illustrated, the number of accumulation apparatuses 20 in the accumulation apparatus group G20 can be optionally determined as well. In the embodiments of the invention of the present application, an accumulation apparatus 20 for accumulation is identified according to a particular key. Thus, datasets associated with the particular key are accumulated only in a particular accumulation apparatus 20 and are not accumulated over a plurality of accumulation apparatuses. Hence, the number of accumulation apparatuses 20 in the accumulation apparatus group G20 can be optionally determined according to the load on the accumulation apparatuses 20.

(Modification with Plurality of Input Apparatuses)

An example with a processing system 1c with a plurality of input apparatuses will be described with reference to FIG. 11 to FIG. 14.

In this processing system 1c, the registrator 121 of the processing apparatus 10 receives a first dataset and a key identifying processing to be performed on the first dataset from a first input apparatus 31, and inputs the received first dataset and key to a first update reception apparatus 20u being one of the plurality of accumulation apparatuses 20. The registrator 121 also receives a second dataset and the key from a second input apparatus 32 and inputs the received second dataset and key to a second update reception apparatus 20u being one of the plurality of accumulation apparatuses 20.

The outputter 122 acquires the first dataset and the second dataset associated with the key from the accumulation apparatus 20 (identified accumulation apparatus 20s) and, if the acquired first dataset and second dataset satisfy the dataset condition required for the processing associated with the key, performs the processing associated with the key on the acquired first dataset and second dataset, and outputs the processed first dataset and second dataset to the reference apparatus 40.

In the example illustrated in FIG. 11, for a given user terminal 50, the processing system 1c outputs any global address used by the user of the terminal 50 and its connection time to the reference apparatus 40.

When the user terminal 50 connects to a public network 60, the user terminal 50 uses a private address to connect to an authentication server 31 such as a RADIUS server, and the private address is translated into a global address at an address translation server 32. The user terminal 50 uses the global address allocated thereto by the address translation server 32 to utilize a server or the like connected to the public network 60. Description will now be given of a case of utilizing the processing system 1 of the invention of the present application in a case where, for example, an inquiry is received about the identification of the user of the user terminal 50 regarding given global addresses from the server or the like connected to the public network 60.

In the example illustrated in FIG. 11, the input apparatuses 30 are the authentication server (first input apparatus) 31 and the address translation server (second input apparatus) 32. First data D1 is inputted to the processing system 1c from the authentication server 31, and second data D2 is inputted to the processing system 1c from the address translation server 32.

The first data D1 contains a user ID of the user using the user terminal 50, the private address allocated to this user, and the connection time of this user to the authentication server 31 (first input apparatus). The data D2 contains the private address used by the user, each global address translated from the private address, and the usage time of the global address.

As illustrated in FIG. 12, in processing template data 111c in the processing apparatus 10, a private address "PID1" used at the authentication server 31 is set as a key. For this private address, overlap between the connection time at the first input apparatus 31 acquired from the authentication server 31 and the time of usage of the global address acquired from the address translation server 32 is set as a "condition" for outputting data to the reference apparatus 40. Also, outputting data D3 in which the user ID, the global address, and the overlap time are associated with each other to the reference apparatus 40 is set as "processing."

As illustrated in FIG. 13, in accumulated data 211c in the accumulation apparatus 20, datasets containing the private address are associated with the key, which is the private address. A dataset received from the authentication server 31 and datasets received from the address translation server 32 are associated with the private address. A user ID "USER_A" for the user using this private address is associated with the dataset received from the authentication server 31. Global addresses "GID1" and "GID2" translated from the private address are associated with the two datasets received from the address translation server 32, respectively. Note that the example illustrated in FIG. 13 describes a case where one dataset is transmitted from the authentication server 31 and two datasets are transmitted from the address translation server 32 for one private address "PID1." However, the numbers of datasets are not limited to these numbers.

If the connection time in the first data D1 and the usage time in the second data D2 which are associated with the given private address overlap each other, the outputter 122 of such a processing apparatus 10c outputs data D3 in which the user ID, the global address, and the overlap time are associated with each other based on the first data D1 and the second data D2 to the reference apparatus.

Specifically, the connection time 8:00 to 12:00, which is received from the authentication server 31, and the time 8:00 to 9:00, during which the global address "GID1" is used, overlap each other. Moreover, the connection time 8:00 to 12:00, which is received from the authentication server 31, and the time 9:00 to 10:30, during which the global address "GID2" is used, overlap each other. Thus, the processing apparatus 10c outputs, as output data D3, data indicating that the user ID "USER_A" has used the global address "GID1" from 8:00 to 9:00 and used the global address "GID2" from 9:00 to 10:30.

Note that in the example illustrated in this modification, the timing to output the data to the reference apparatus 40 may be any timing. For example, as mentioned above, it may be possible to sequentially transmit output data D3 to the reference apparatus 40 to generate data in which user IDs, global addresses, and times are associated with each other and, upon receipt of an inquiry from the server or the like connected to the public network 60 about the identification of a user who has used a given global address, refer to this data to respond to the inquiry. Alternatively, upon receipt of an inquiry from the server or the like connected to the public network 60 about the identification of a user who has used a given global address, it may be possible to search the accumulated data 211 with the global address in the inquiry used as a key and extract related data to generate output data D3 and respond to the inquiry with it.

Other Embodiments

Although an embodiment and modifications of the present invention have been described above, it should not be understood that the statement and the drawings constituting part of this disclosure limit this invention. Various alternative embodiments, examples, and operation techniques will become apparent to those skilled in the art from this disclosure.

The present invention of course includes various embodiments and the like which are not described herein. Therefore, the technical scope of the present invention is determined solely by the matters specifying the invention according to the claims that are considered appropriate from the foregoing description.

REFERENCE SIGNS LIST

1 processing system
2 communication network
10 processing apparatus
20 accumulation apparatus
20u update reception apparatus
20r reference reception apparatus
20s identified accumulation apparatus
30 input apparatus
31 authentication server
32 address translation server
40 reference apparatus
50 user terminal
60 public network
110, 210 storage device
111 processing template data
120, 220 processing control device
121 registrator
122 outputter
130, 230 communication control device
211 accumulated data
221 update requester
222 updater
223 reference requester
224 referrer
G20 accumulation apparatus group

The invention claimed is:

1. A processing method used in a processing system including a processing apparatus and a plurality of accumulation apparatuses, comprising the steps of:
   causing the processing apparatus to receive a dataset and a key identifying processing to be performed on the dataset from an input apparatus, and input the received dataset and key to an update reception apparatus being one of the plurality of accumulation apparatuses;
   causing the update reception apparatus to identify an accumulation apparatus in which to accumulate the dataset among the plurality of accumulation apparatuses based on the key and transmit an update request containing the dataset and the key to the identified accumulation apparatus;
   causing the identified accumulation apparatus to store the dataset and the key in association with each other upon receipt of the update request;
   causing the identified accumulation apparatus to acquire the dataset stored in association with the key and transmit the dataset to the processing apparatus; and
   causing the processing apparatus to compare the dataset acquired from the identified accumulation apparatus with a dataset condition, and if the dataset acquired from the identified accumulation apparatus satisfies the dataset condition required for the processing associated with the key, causing the processing apparatus to perform the processing associated with the key on the acquired dataset and output the processed dataset to a reference apparatus.

2. The processing method according to claim 1, further comprising the steps of:
   causing the processing apparatus to input the key to a reference reception apparatus being one of the plurality of accumulation apparatuses; and
   causing the reference reception apparatus to transmit a reference request containing the key to the accumulation apparatus identified based on the key,
   wherein upon receipt of the reference request, the identified accumulation apparatus acquires the dataset stored in association with the key and transmits the dataset to the processing apparatus.

3. The processing method according to claim 1, wherein
   in the step of causing the processing apparatus to input the received dataset and key, the processing apparatus performs pre-processing associated with the key on the dataset and inputs the pre-processed dataset and the key to the update reception apparatus,
   the update reception apparatus transmits an update request containing the pre-processed dataset and the key to the identified accumulation apparatus, and
   the identified accumulation apparatus stores the pre-processed dataset and the key in association with each other.

4. The processing method according to claim 3, wherein in a case of outputting the number of datasets sequentially received from the input apparatus to the reference apparatus, the identified accumulation apparatus stores the number of already received datasets as the pre-processed dataset, upon receipt of a new dataset and the key from the input apparatus, the processing apparatus inputs a value obtained in the pre-processing by adding 1 to the number of already received datasets acquired from the identified accumulation apparatus, to the update reception apparatus as a new pre-processed dataset, the update reception apparatus transmits an update request containing the new pre-processed dataset and the key to the identified accumulation apparatus, and the identified accumulation apparatus updates the pre-processed dataset associated with the key to the new pre-processed dataset.

5. The processing method according to claim 3, wherein in a case of outputting an average of values contained in datasets sequentially received from the input apparatus to the reference apparatus, the identified accumulation apparatus stores a numerical value equivalent to a sum of values contained in already received datasets and the number of the values as the pre-processed dataset, upon receipt of a new dataset and the key from the input apparatus, the processing apparatus inputs a new pre-processed dataset to the update reception apparatus, the new pre-processed dataset containing a new numerical value obtained in the pre-processing by updating the numerical value equivalent to the sum of the values acquired from the identified accumulation apparatus based on one or more values contained in the new dataset, and a new number of values obtained in the pre-processing by adding the number of the one or more values contained in the new dataset to the number of values acquired from the identified accumulation apparatus, the update reception apparatus transmits an update request containing the new pre-processed dataset and the key to the identified accumulation apparatus, and the identified accumulation apparatus updates the pre-processed dataset associated with the key to the new pre-processed dataset.

6. The processing method according to claim 3, wherein the pre-processing is processing of determining whether or not the dataset satisfies a predetermined condition, and the pre-processed dataset is a flag indicating whether or not the predetermined condition is satisfied.

7. The processing method according to claim 1, wherein if the processing apparatus receives a plurality of keys associated with a particular dataset from the input apparatus, the processing apparatus performs processing for each of the plurality of keys.

8. A processing method for use with a processing system including a processing apparatus and a plurality of accumulation apparatuses, comprising the steps of:

causing the processing apparatus to receive a first dataset and a key identifying processing to be performed on the first dataset from a first input apparatus, and input the received first dataset and key to a first update reception apparatus being one of the plurality of accumulation apparatuses;

causing the first update reception apparatus to identify an accumulation apparatus in which to accumulate the first dataset among the plurality of accumulation apparatuses based on the key and transmit a first update request containing the first dataset and the key to the identified accumulation apparatus;

causing the identified accumulation apparatus to store the first dataset and the key in association with each other upon receipt of the first update request;

causing the processing apparatus to receive a second dataset and the key from a second input apparatus, and input the received second dataset and key to a second update reception apparatus being one of the plurality of accumulation apparatuses;

causing the second update reception apparatus to transmit a second update request containing the second dataset and the key to the identified accumulation apparatus;

causing the identified accumulation apparatus to store the second dataset and the key in association with each other upon receipt of the second update request; and causing the processing apparatus to acquire the first dataset and the second dataset associated with the key from the identified accumulation apparatus, causing the processing apparatus to compare the acquired first dataset and the acquired second dataset with a dataset condition, and, if the acquired first dataset and second dataset satisfy the dataset condition required for the processing associated with the key, perform the processing associated with the key on the acquired first dataset and second dataset and output the processed first dataset and second dataset to a reference apparatus.

9. The processing method according to claim 8, wherein the first input apparatus is an authentication server that verifies a user terminal, the second input apparatus is an address translation server that translates a private address of the user terminal into a global address, the key is the private address of the user terminal, the first dataset contains an identifier and connection time of the user terminal, the second dataset contains the global address and usage time of the global address, if the connection time in the first dataset and the usage time in the second dataset, which are associated with the private address, overlap each other, the processing apparatus outputs data in which the identifier, the global address, and the overlap time are associated with each other based on the first dataset and the second dataset to the reference apparatus.

10. A processing system comprising:

a processing apparatus; and a plurality of accumulation apparatuses, wherein each of the accumulation apparatuses includes an update requester that, upon receipt of a dataset and a key identifying processing to be performed on the dataset inputted from the processing apparatus, identifies an accumulation apparatus in which to accumulate the dataset among the plurality of accumulation apparatuses based on the key and transmits an update request containing the dataset and the key to the identified accumulation apparatus, an updater that stores the dataset and the key in association with each other upon receipt of the update request, and a referrer that acquires the dataset stored in association with the key and transmits the dataset to the processing apparatus, and the processing apparatus includes a registrator that receives a dataset and a key identifying processing to be performed on the dataset from an input apparatus, and inputs the received dataset and key to an update reception apparatus being one of the plurality of accumulation apparatuses, and an outputter that, compares the dataset received by the registrator with a dataset condition required for the processing associated with the key, and if the dataset acquired from the identified accumulation apparatus based on the key satisfies the dataset condition required for the processing associated with the key, performs the processing associated with the key on the acquired dataset and outputs the processed dataset to a reference apparatus.

11. The processing system according to claim 10, wherein the outputter of the processing apparatus further inputs the key to a reference reception apparatus being one of the plurality of accumulation apparatuses, each of the accumulation apparatuses further includes a reference requester that, upon receipt of the key inputted from the processing apparatus, transmits a reference request containing the key to the accumulation apparatus identified based on the key, upon receipt of the reference request, the referrer of the identified accumulation apparatuses acquires the dataset stored in association with the key and outputs the dataset to the processing apparatus.

12. The processing system according to claim 10, wherein the registrator of the processing apparatus further performs pre-processing associated with the key on the dataset and inputs the pre-processed dataset and the key to the update reception apparatus, the update requester of the identified accumulation apparatuses transmits an update request containing the pre-processed dataset and the key to the identified accumulation apparatus, and the updater of the identified accumulation apparatuses stores the pre-processed dataset and the key in association with each other.

13. A processing system comprising:
a processing apparatus; and
a plurality of accumulation apparatuses,
wherein each of the accumulation apparatuses includes
an update requester that, upon receipt of a dataset and a key identifying processing to be performed on the dataset inputted from the processing apparatus, identifies an accumulation apparatus in which to accumulate the dataset among the plurality of accumulation apparatuses based on the key and transmits an update request containing the dataset and the key to the identified accumulation apparatus,
an updater that stores the dataset and the key in association with each other upon receipt of the update request, and
a referrer that acquires the dataset stored in association with the key and transmits the dataset to the processing apparatus, and
the processing apparatus includes
a registrator that receives a first dataset and a key identifying processing to be performed on the first dataset from a first input apparatus, and inputs the received first dataset and key to a first update reception apparatus being one of the plurality of accumulation apparatuses, and receives a second dataset and the key from a second input apparatus and inputs the received second dataset and key to a second update reception apparatus being another one of the plurality of accumulation apparatuses, and
an outputter that acquires the first dataset and the second dataset associated with the key from the identified accumulation apparatus, compares the acquired first dataset and the acquired second dataset with a dataset condition, and, if the acquired first dataset and second dataset satisfy the dataset condition required for the processing associated with the key, performs the processing associated with the key on the acquired first dataset and second dataset and outputs the processed first dataset and second dataset to a reference apparatus.

* * * * *